United States Patent
Bell et al.

(10) Patent No.: US 10,718,649 B2
(45) Date of Patent: Jul. 21, 2020

(54) MULTI-CHANNEL FLOW TUBE

(71) Applicant: Micro Motion, Inc., Boulder, CO (US)

(72) Inventors: Mark James Bell, Longmont, CO (US); Joel Weinstein, Boulder, CO (US); Martin Andrew Schlosser, Boulder, CO (US); Frederick Scott Schollenberger, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 30 days.

(21) Appl. No.: 16/095,630

(22) PCT Filed: May 16, 2016

(86) PCT No.: PCT/US2016/032644
§ 371 (c)(1),
(2) Date: Oct. 22, 2018

(87) PCT Pub. No.: WO2017/200518
PCT Pub. Date: Nov. 23, 2017

(65) Prior Publication Data
US 2019/0128719 A1 May 2, 2019

(51) Int. Cl.
*G01F 1/84* (2006.01)
*G01F 15/08* (2006.01)
(Continued)

(52) U.S. Cl.
CPC .............. *G01F 1/8477* (2013.01); *G01F 1/76* (2013.01); *G01F 1/8486* (2013.01);
(Continued)

(58) Field of Classification Search
CPC .............. G01F 1/76; G01F 1/84; G01F 15/08
See application file for complete search history.

(56) References Cited

U.S. PATENT DOCUMENTS

| 2,821,084 A | 1/1958 | Altfillisch et al. |
| 4,252,028 A | 2/1981 | Smith et al. |

(Continued)

FOREIGN PATENT DOCUMENTS

| JP | S62170819 A | 7/1987 |
| JP | H09133564 A | 5/1997 |
| WO | 2006127529 A2 | 11/2006 |

*Primary Examiner* — Jewel V Dowtin
(74) *Attorney, Agent, or Firm* — The Ollila Law Group LLC

(57) ABSTRACT

A vibratory meter (5) including a multi-channel flow tube (130) is provided. The vibratory meter (5) includes a meter electronics (20) and a meter assembly (10) communicatively coupled to the meter electronics (20). The meter assembly (10) includes the multi-channel flow tube (130, 330, 430, 530) comprising two or more fluid channels (132, 332, 432, 532) surrounded by a tube wall (134, 334, 434, 534). The two or more fluid channels (132, 332, 432, 532) and tube wall (134, 334, 434, 534) comprise a single integral structure. A driver (180) is coupled to the multi-channel flow tube (130, 330, 430, 530). The driver (180) is configured to vibrate the multi-channel flow tube (130, 330, 430, 530). The two or more fluid channels (132, 332, 432, 532) and tube wall (134, 334, 434, 534) are configured to deform in the same direction as the single integral structure in response to a drive signal applied to the driver (180).

17 Claims, 11 Drawing Sheets

(51) Int. Cl.
*G01F 1/76* (2006.01)
*G01N 9/00* (2006.01)

(52) U.S. Cl.
CPC ............ *G01F 1/8495* (2013.01); *G01F 15/08* (2013.01); *G01N 2009/006* (2013.01)

(56) References Cited

U.S. PATENT DOCUMENTS

| | | | |
|---|---|---|---|
| 5,090,253 A | 2/1992 | Kolpak | |
| 5,259,250 A | 11/1993 | Kolpak | |
| 8,813,576 B2 * | 8/2014 | Li | G01F 1/8409 73/861.355 |
| 8,826,744 B2 * | 9/2014 | Rieder | G01F 1/8404 73/861.355 |
| 8,863,589 B2 * | 10/2014 | Bitto | G01F 15/14 73/861.355 |
| 9,410,835 B2 * | 8/2016 | Huber | G01F 15/02 |
| 2005/0193832 A1 | 9/2005 | Tombs et al. | |
| 2017/0350742 A1 * | 12/2017 | Zhu | G01F 1/8413 |
| 2017/0356777 A1 * | 12/2017 | Zhu | G01F 1/8477 |

* cited by examiner

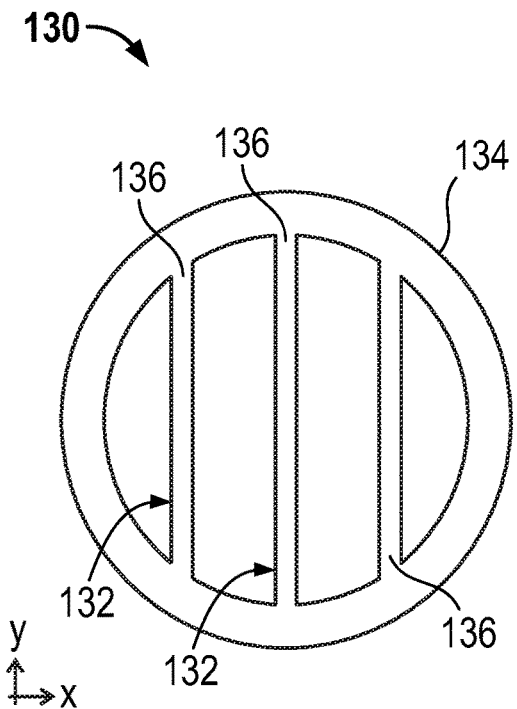
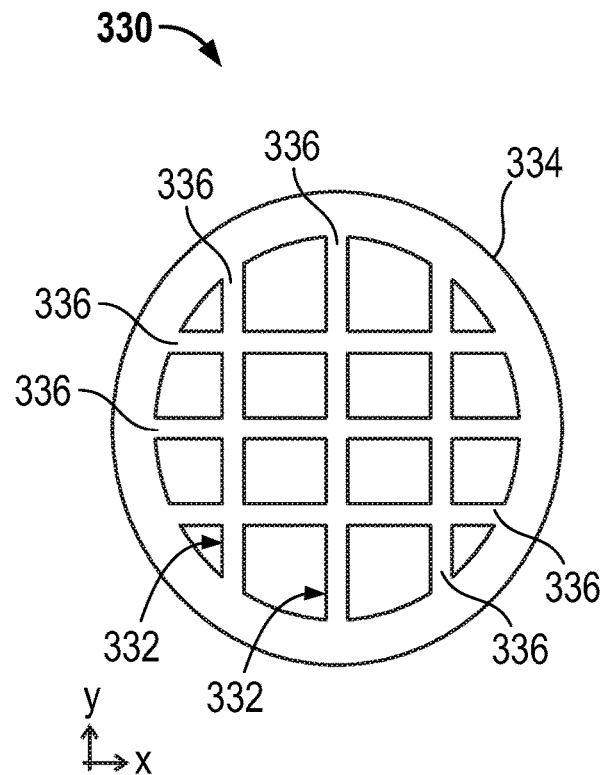
FIG. 2
FIG. 3
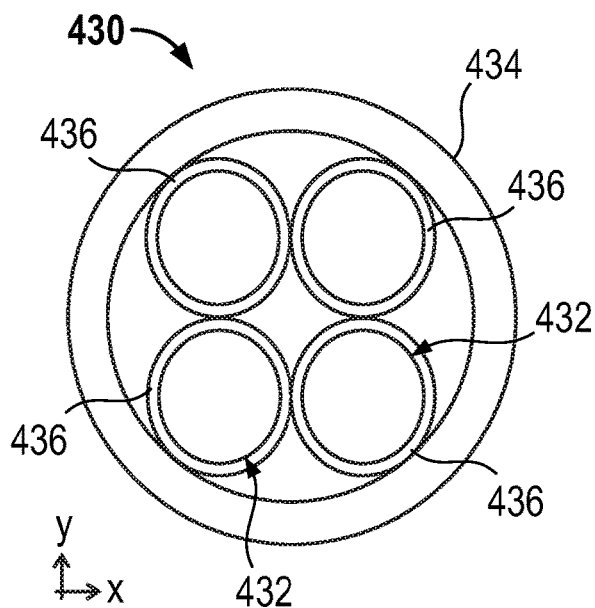
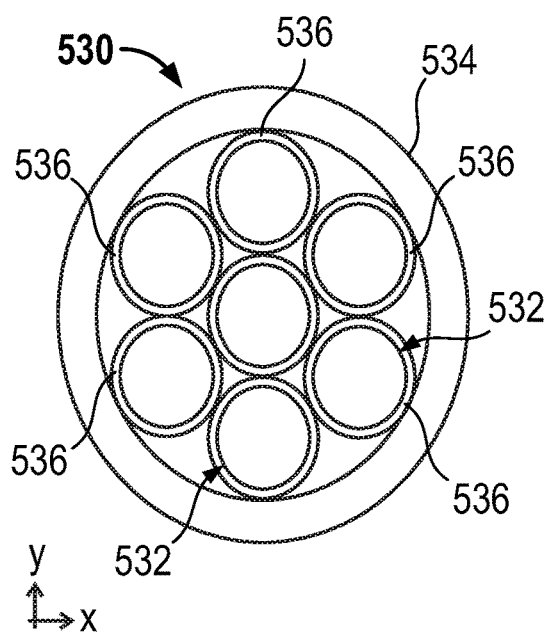
FIG. 4
FIG. 5

MULTI-CHANNEL FLOW TUBE

TECHNICAL FIELD

The embodiments described below relate to vibratory sensors and, more particularly, to a multi-channel flow tube.

BACKGROUND

Vibrating meters, such as for example, vibrating densitometers and Coriolis flow meters are generally known, and are used to measure mass flow and other information related to materials flowing through a conduit in the vibratory meter. Exemplary Coriolis flow meters are disclosed in U.S. Pat. Nos. 4,109,524, 4,491,025, and Re. 31, 450. These vibratory meters have meter assemblies with one or more conduits of a straight or curved configuration. Each conduit configuration in a Coriolis mass flow meter, for example, has a set of natural vibration modes, which may be of simple bending, torsional, or coupled type. Each conduit can be driven to oscillate at a preferred mode. When there is no flow through the flowmeter, a driving force applied to the conduit(s) causes all points along the conduit(s) to oscillate with identical phase or with a small "zero offset", which is a time delay measured at zero flow.

As material begins to flow through the conduit(s), Coriolis forces cause each point along the conduit(s) to have a different phase. For example, the phase at the inlet end of the flowmeter lags the phase at the centralized driver position, while the phase at the outlet leads the phase at the centralized driver position. Pickoffs on the conduit(s) produce sinusoidal signals representative of the motion of the conduit(s). Signals output from the pickoffs are processed to determine the time delay between the pickoffs. The time delay between the two or more pickoffs is proportional to the mass flow rate of material flowing through the conduit(s).

A meter electronics connected to the driver generates a drive signal to operate the driver and also to determine a mass flow rate and/or other properties of a process material from signals received from the pickoffs. The driver may comprise one of many well-known arrangements; however, a magnet and an opposing drive coil have received great success in the flowmeter industry. An alternating current is passed to the drive coil for vibrating the conduit(s) at a desired conduit amplitude and frequency. It is also known in the art to provide the pickoffs as a magnet and coil arrangement very similar to the driver arrangement.

Entrained gas is a common application problem for Coriolis flow meters. Improvements have been made to flow meters that improve performance in the presence of gas. These include improved alarm handling, better signal processing and noise rejection, wider mode separation, etc. However, accurate multiphase measurement may still be problematic due to three main error mechanisms—fluid decoupling, velocity of sound (VOS) effects, and asymmetric damping. It may not be possible to compensate for these error mechanisms without specific knowledge of parameters including bubble size, void fraction, liquid viscosity, speed of sound, and pressure. Flow profile effects are another area of concern for all types of flow meters, including large Coriolis flow meters. When Reynolds number is low, typically due to high viscosity, there are flow profile-related effects, which cause a reduction in sensitivity in Coriolis flow meters. Larger meters, which have a smaller tube length to tube diameter ratio, are more adversely affected. Larger meters also require thicker tube walls to contain high-pressure fluids. Accordingly, there is a need for flow tubes with a smaller tube length to tube diameter ratio and flow meters that can accurately measure a flow rate of a fluid. Such solutions can be realized with a multi-channel flow tube.

SUMMARY

A vibratory meter including a multi-channel flow tube is provided. According to an embodiment, the vibratory meter comprises a meter electronics and a meter assembly communicatively coupled to the meter electronics. The meter assembly includes the multi-channel flow tube comprising two or more fluid channels surrounded by a tube wall. The two or more fluid channels and tube wall comprise a single integral structure. The meter assembly also includes a driver coupled to the multi-channel flow tube. The driver is configured to vibrate the multi-channel flow tube. The two or more fluid channels and tube wall are configured to deform in a same direction as the single integral structure in response to a drive signal applied to the driver.

A method of measuring a fluid with a multi-channel flow tube is provided. According to an aspect, the method comprises separating the fluid into two or more fluid channels in a multi-channel flow tube surrounded by a tube wall, wherein the two or more fluid channels and tube wall comprise a single integral structure. The method also includes applying a drive signal to a driver coupled to the multi-channel flow tube, the driver being configured to vibrate the multi-channel flow tube. The method also includes deforming the two or more fluid channels and the tube wall in a same direction as the single integral structure in response to the drive signal applied to the driver and measuring a deflection of the multi-channel flow tube with a sensor attached to the multi-channel flow tube.

A method of measuring a fluid with a multi-channel flow tube is provided. According to an aspect, the method comprises measuring a density of the fluid with the multi-channel flow tube, determining a gas void fraction using the measured density, and compensating a flow rate measurement using the gas void fraction.

ASPECTS

According to an aspect, a vibratory meter (5) including a multi-channel flow tube (130), the vibratory meter (5) comprises a meter electronics (20) and a meter assembly (10) communicatively coupled to the meter electronics (20). The meter assembly (10) includes the multi-channel flow tube (130, 330, 430, 530) comprising two or more fluid channels (132, 332, 432, 532) surrounded by a tube wall (134, 334, 434, 534). The two or more fluid channels (132, 332, 432, 532) and tube wall (134, 334, 434, 534) comprise a single integral structure. The meter assembly (10) also includes a driver (180) coupled to the multi-channel flow tube (130, 330, 430, 530). The driver (180) is configured to vibrate the multi-channel flow tube (130, 330, 430, 530). The two or more fluid channels (132, 332, 432, 532) and tube wall (134, 334, 434, 534) are configured to deform in a same direction as the single integral structure in response to a drive signal applied to the driver (180).

Preferably, the two or more fluid channels (132) are defined by one or more channel divisions (136) having a planar shape extending along a longitudinal length of the multi-channel flow tube (130).

Preferably, the two or more fluid channels (432, 532) are defined by channel tubes (436, 536) affixed to each other and extending along a longitudinal length of the multi-channel flow tube (430, 530).

Preferably, the two or more fluid channels (132, 332, 432, 532) are substantially parallel with each other.

Preferably, each of the two or more fluid channels (132, 332, 432, 532) has at least one of a rectangular cross section and a circular cross section.

Preferably, a longitudinal length of the two or more fluid channels (132, 332, 432, 532) is substantially equal to a longitudinal length of a vibratory portion of the multi-channel flow tube (130, 330, 430, 530).

Preferably, a longitudinal length of the tube wall (134, 334, 434, 534) is substantially equal to a longitudinal length of the two or more fluid channels (132, 332, 432, 532).

According to an aspect, a method of measuring a fluid with a multi-channel flow tube comprises separating the fluid into two or more fluid channels in a multi-channel flow tube surrounded by a tube wall, wherein the two or more fluid channels and tube wall comprise a single integral structure. The method also comprises applying a drive signal to a driver coupled to the multi-channel flow tube, the driver being configured to vibrate the multi-channel flow tube. The method also comprises deforming the two or more fluid channels and the tube wall in a same direction as the single integral structure in response to the drive signal applied to the driver and measuring a deflection of the multi-channel flow tube with a sensor attached to the multi-channel flow tube.

Preferably, separating the fluid into two or more fluid channels comprises separating a gas component of the fluid into one of the two or more fluid channels.

Preferably, separating the fluid into two or more fluid channels comprises filling a cross section of one of the two or more fluid channels with a gas component of the fluid.

Preferably, applying the drive signal to the driver coupled to the multi-channel flow tube comprises applying the drive signal to the driver coupled to the tube wall, wherein the two or more fluid channels are defined by one or more channel divisions having a planar shape extending along a longitudinal length of the multi-channel flow tube.

Preferably, applying the drive signal to the driver coupled to the multi-channel flow tube comprises applying the drive signal to the driver coupled to the tube wall, wherein the two or more fluid channels are defined by channel tubes affixed to each other and extending along a longitudinal length of the multi-channel flow tube.

Preferably, deforming the two or more fluid channels and the tube wall in the same direction comprises deforming a longitudinal length of the two or more fluid channels that is substantially equal to a longitudinal length of a vibratory portion of the multi-channel flow tube.

Preferably, deforming the two or more fluid channels and the tube wall in the same direction comprises deforming a longitudinal length of the tube wall that is substantially equal to a longitudinal length of the two or more fluid channels.

According to an aspect, a method of measuring a fluid with a multi-channel flow tube comprises measuring a density of the fluid with the multi-channel flow tube, determining a gas void fraction using the measured density, and compensating a flow rate measurement using the gas void fraction.

Preferably, determining the gas void fraction using the measured density comprises determining the gas void fraction from a predetermined correlation between the density measurement and the gas void fraction.

Preferably, compensating the flow rate measurement comprises determining a flow rate error from a predetermined correlation between the flow rate error and the gas void fraction and compensating the flow rate measurement using the flow rate error.

BRIEF DESCRIPTION OF THE DRAWINGS

The same reference number represents the same element on all drawings. It should be understood that the drawings are not necessarily to scale.

FIG. 2 shows a cross-section of the multi-channel flow tube 130 shown in FIG. 1 according to an embodiment.

FIG. 3 shows a cross-section of another multi-channel flow tube 330 according to an embodiment.

FIG. 4 shows a cross-section of another multi-channel flow tube 430 according to an embodiment.

FIG. 5 shows a cross-section of another multi-channel flow tube 530 according to an embodiment.

DETAILED DESCRIPTION

FIGS. 1-14 and the following description depict specific examples to teach those skilled in the art how to make and use the best mode of embodiments of a multi-channel flow tube. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the multi-channel flow tube. As a result, the embodiments described below are not limited to the specific examples described below, but only by the claims and their equivalents.

A vibratory meter includes a meter electronics that is communicatively coupled to a meter assembly. The multi-channel flow tube is part of the meter assembly. The multi-channel flow tube includes two or more fluid channels. A driver is coupled to the multi-channel flow tube and is configured to vibrate the multi-channel flow tube. The two or more fluid channels are configured to bend in the same direction as an integral structure in response to a drive signal applied to the driver. The two or more fluid channels may be formed, for example, by extrusion, 3D printing, brazing channel tubes, etc., which is surrounded by a tube wall.

An effective diameter of the two or more fluid channels is less than a diameter of the tube wall. Due to the effective diameter of the multi-channel flow tube being smaller than the diameter of the tube wall, the performance issues related to compressibility, decoupling, and flow profile effects may be improved. These improvements can result in flow rate measurements that are more accurate than measurements by a standard flow tube. In addition, pressure containment may be improved of the multi-channel flow tube over a standard flow tube. As a result, the vibratory flow meter may be less expensive than many multiphase technologies, use simpler manufacturing techniques, while also providing accurate multiphase flow rate measurements.

Vibratory Sensor System

Figure 1:
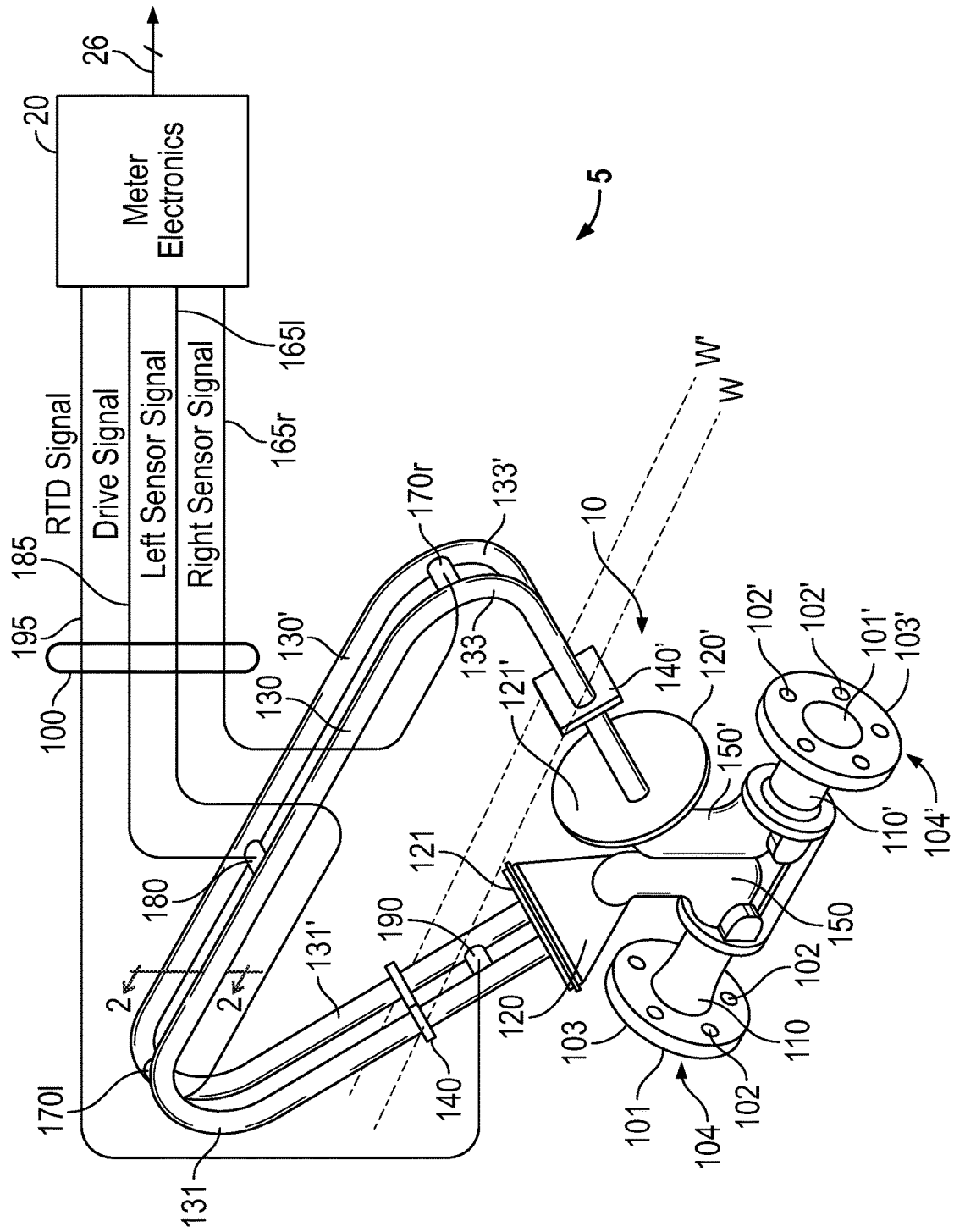
FIG. 1 shows a vibratory meter 5 with a multi-channel flow tube 130 according to an embodiment.

FIG. 1 shows a vibratory meter 5 with a multi-channel flow tube 130 according to an embodiment. As shown in FIG. 1, the vibratory meter 5 comprises a meter assembly 10 and meter electronics 20. The meter assembly 10 responds to mass flow rate and density of a process material. The meter electronics 20 is connected to the meter assembly 10 via leads 100 to provide density, mass flow rate, and temperature information over path 26, as well as other information. A Coriolis flow meter structure is described although it is apparent to those skilled in the art that the present invention could be practiced as a vibrating tube densitometer, tuning fork densitometer, or the like.

The meter assembly 10 includes a pair of manifolds 150 and 150', flanges 103 and 103' having flange necks 110 and 110', a pair of parallel multi-channel flow tubes 130 and 130', driver 180, resistive temperature detector (RTD) 190, and a pair of pick-off sensors 170*l* and 170*r*. Multi-channel flow tubes 130 and 130' have two essentially straight inlet legs 131, 131' and outlet legs 133, 133', which converge towards each other at flow tube mounting blocks 120 and 120'. The multi-channel flow tubes 130, 130' bend at two symmetrical locations along their length and are essentially parallel throughout their length. Brace bars 140 and 140' serve to define the axis W and W' about which each multi-channel flow tube 130, 130' oscillates. The legs 131, 131' and 133, 133' of the multi-channel flow tubes 130, 130' are fixedly attached to flow tube mounting blocks 120 and 120' and these blocks, in turn, are fixedly attached to manifolds 150 and 150'. This provides a continuous closed material path through meter assembly 10.

When flanges 103 and 103', having holes 102 and 102' are connected, via inlet end 104 and outlet end 104' into a process line (not shown) which carries the process material that is being measured, material enters inlet end 104 of the meter through an orifice 101 in the flange 103 and is conducted through the manifold 150 to the flow tube mounting block 120 having a surface 121. Within the manifold 150, the material is divided and routed through the multi-channel flow tubes 130, 130'. Upon exiting the multi-channel flow tubes 130, 130', the process material is recombined in a single stream within the flow tube mounting block 120' having a surface 121' and the manifold 150' and is thereafter routed to outlet end 104' connected by the flange 103' having holes 102' to the process line (not shown).

The multi-channel flow tubes 130, 130' are selected and appropriately mounted to the flow tube mounting blocks 120, 120' so as to have substantially the same mass distribution, moments of inertia and Young's modulus about bending axes W-W and W'-W', respectively. These bending axes go through the brace bars 140, 140'. Inasmuch as the Young's modulus of the flow tubes change with temperature, and this change affects the calculation of flow and density, RTD 190 is mounted to the multi-channel flow tube 130' to continuously measure the temperature of the multi-channel flow tube 130'. The temperature of the multi-channel flow tube 130' and hence the voltage appearing across the RTD 190 for a given current passing therethrough is governed by the temperature of the material passing through the multi-channel flow tube 130'. The temperature dependent voltage appearing across the RTD 190 is used in a well-known method by the meter electronics 20 to compensate for the change in elastic modulus of the multi-channel flow tubes 130, 130' due to any changes in flow tube temperature. The RTD 190 is connected to the meter electronics 20 by lead 195.

Both of the multi-channel flow tubes 130, 130' are driven by driver 180 in opposite directions about their respective bending axes W and W' and at what is termed the first out-of-phase bending mode of the flow meter. This driver 180 may comprise any one of many well-known arrangements, such as a magnet mounted to the multi-channel flow tube 130' and an opposing coil mounted to the multi-channel flow tube 130 and through which an alternating current is passed for vibrating both of the multi-channel flow tubes 130, 130'. A suitable drive signal is applied by the meter electronics 20, via lead 185, to the driver 180.

The meter electronics 20 receives the RTD temperature signal on lead 195, and the left and right sensor signals appearing on leads 165*l*, 165*r*, respectively. The meter electronics 20 produces the drive signal appearing on lead 185 to driver 180 and vibrate multi-channel flow tubes 130, 130'. The meter electronics 20 processes the left and right sensor signals and the RTD signal to compute the mass flow rate and the density of the material passing through meter assembly 10. This information, along with other information, is applied by meter electronics 20 over path 26 as a signal.

The multi-channel flow tubes 130, 130' have a plurality of fluid channels through which a material, such as a multi-phase fluid, can flow. That is, the fluid flowing through the multi-channel flow tubes 130, 130' flow through two or more fluid channels. The multi-channel flow tubes 130, 130' improve errors in multiphase measurement by addressing issues associated with fluid decoupling, velocity of sound (VOS) effects, and asymmetric damping. The multi-channel flow tubes 130, 130' can reduce these error mechanisms without specific knowledge of parameters including bubble size, void fraction, liquid viscosity, speed of sound, and pressure. The multi-channel flow tubes 130, 130' also reduce the flow profile effects, which are another area of concern for all types of vibratory meters, by effectively increasing the tube length (L) to tube diameter (D) ratio, as is explained in more detail in the following.

Cross-Sections

FIG. 2 shows a cross-section of the multi-channel flow tube 130 shown in FIG. 1 according to an embodiment. A reference coordinate system with x and y-axes is also shown. The multi-channel flow tube 130 includes two or more fluid channels 132. As shown in FIG. 1, the two or more fluid channels 132 are disposed within a tube wall 134. The two or more fluid channels 132 are defined by channel divisions 136 within the tube wall 134. The channel divisions 136 lie within a plane that is parallel with a single axis. As shown, the channel divisions 136 are formed in planes perpendicular to the x-axis of the reference coordinate system.

FIG. 3 shows a cross-section of another multi-channel flow tube 330 according to an embodiment. A reference coordinate system with x and y-axes is also shown. The multi-channel flow tube 330 includes two or more fluid channels 332. As shown in FIG. 3, the two or more fluid channels 332 are disposed within a tube wall 334. The two or more fluid channels 332 are defined by channel divisions 336 within the tube wall 334. The channel divisions 336 lie within planes that are parallel with the x and y-axis. The channel divisions 336 are perpendicular to each other. The channel divisions 336 are both parallel with and perpendicular to the x and y-axis of the reference coordinate system.

FIG. 4 shows a cross-section of another multi-channel flow tube 430 according to an embodiment. A reference coordinate system with x and y-axes is also shown. The multi-channel flow tube 430 includes two or more fluid channels 432. Only one of the two or more fluid channels 432 is referenced for clarity. As shown in FIG. 4, the two or more fluid channels 432 are disposed within a tube wall 434. The two or more fluid channels 432 are defined by channel tubes 436 within the tube wall 434. The multi-channel flow tube 430 is a tube bundle. In other words, the multi-channel flow tube 430 is formed by a bundle of the channel tubes 436 configured to move as an integral structure. More specifically, the upper two and lower two of the channel tubes 436 each form a plane that is parallel with the x-axis of the reference coordinate system. Similarly, the left two and the right two of the channel tubes 436 each form a plane that is parallel to the y-axis of the reference coordinate system.

FIG. 5 shows a cross-section of another multi-channel flow tube 530 according to an embodiment. The multi-channel flow tube 530 includes two or more fluid channels 532. Only one of the two or more fluid channels 532 is referenced for clarity. As shown in FIG. 5, the two or more fluid channels 532 are disposed within a tube wall 534. The two or more fluid channels 532 are defined by channel tubes 536 disposed within the tube wall 534. The multi-channel flow tube 530 is a tube bundle. In other words, the multi-channel flow tube 530 is formed by a bundle of the channel tubes 536 configured to move as an integral structure. The channel tubes 536 are disposed concentrically about a longitudinal axis of the tube wall 534.

In these and other embodiments, the two or more fluid channels 132, 332-532 are configured to bend in the same direction as an integral structure in response to a drive signal applied to the driver 180. For example, with reference to the two or more fluid channels 332 shown in FIG. 3, the tube wall 334 surrounds the two or more fluid channels 332. As a result, the tube wall 334 deforms (e.g., bends) in response to a force applied by the driver 180 to the tube wall 334. As shown in FIG. 1, the driver 180 applies the force in the direction perpendicular to the planes formed by the channel divisions 136. The channel divisions 136 have a planar shape that extends along the longitudinal length of the multi-channel flow tube 130.

The two or more fluid channels 132, 332-532 extend longitudinally parallel to one another and the tube wall 134, 334-534. That is, a longitudinal length (e.g., a length extending between flow tube mounting blocks 120, 120') of the two or more fluid channels 132, 332-532 and the tube wall 134, 334-534 are parallel with each other. The longitudinal length may be the same as a vibratory portion of the multi-channel flow tube 130, 330-530 (e.g., the length between the brace bars 140, 140'). However, in alternative embodiments, the two or more fluid channels may not be parallel to one another and/or a tube wall. For example, alternative two or more fluid channels may be twisted relative to each other and/or the tube wall. Additionally or alternatively, the longitudinal length of the tube wall may not be equal to a longitudinal length of the two or more fluid channels.

The cross sections shown in FIGS. 2-5 extend along the longitudinal length of the multi-channel flow tubes 130, 330-530. That is, the cross-sections are consistent from approximately the inlet end 104 and the outlet end 104' of the vibratory meter 5. However, in alternative embodiments, the cross-sections may vary over the longitudinal length of the multi-channel flow tubes 130, 330-530. For example, an alternative multi-channel flow tube may include the cross-section shown in FIG. 2 near an inlet end and an outlet end and the cross-section shown in FIG. 3 in the center portion of the alternative flow tube. In another alternative embodiment, the cross sections can spiral along the longitudinal length of the multi-channel flow tube 130, 330-530. Spiraling the cross-section can cause the multi-channel flow tube 130, 330-530 to act as a centrifuge on the multi-phase fluid and force the heavy liquid to the one side (e.g., outside) of each of the two or more fluid channels 132, 332-532.

Some of the benefits achieved with the use of the multi-channel flow tube 130, 330-530 only require cross-sections in certain locations within the multi-channel flow tube 130, 330-530, for example, in locations of large vibratory deformation. Thus, in certain embodiments, cross-sections may only be employed in specific locations within the multi-channel flow tube 130, 330-530. Other locations could employ a circular cross section without the two or more fluid channels 132, 332-532, so as to reduce the pressure drop through the multi-channel flow tube 130, 330-530.

The cross-sections shown in FIGS. 2-5 are also symmetrical. That is, the cross-sections are mirror images around the x-axis and the y-axis of the reference coordinate system. However, in alternative embodiments the cross-sections may be non-symmetric about the x and/or y-axis of the reference coordinate system. For example, an alternative flow tube may have double axis divisions in a top portion similar to those shown in FIG. 3 and single axis divisions in the lower portion of the flow tube similar to those shown in FIG. 2. The cross-sections may also include divisions from, for example, the four fluid channels 432 shown in FIG. 4 to the seven fluid channels 532 shown in FIG. 5 along the length of the alternative flow tube.

The cross-sections shown in FIGS. 2-5 may be formed by using any suitable materials and methods. For example, the cross sections shown in FIGS. 2 and 3 may be formed as a single integral structure by 3-D printing, extrusion, etc. The cross-sections shown in FIGS. 4 and 5 may be formed by inserting the channel tubes 436-536 into the tube wall 434-534. After the channel tubes 436-536 are inserted into the tube wall 434-534, multiple mandrels may be inserted into the channel tubes 436-536 to press against the wall while the multi-channel flow tubes 130, 330-530 are bent. This can ensure that the channel tubes 436-536 do not collapse. The material used to form the multi-channel flow tubes 130, 330-530 may be any suitable material, such as plastic, metal, etc.

The materials and methods used to form the cross-sections shown in FIGS. 2-5 can form the two or more fluid channels 132, 332-532 as the single integral structure. For example, by extruding the multi-channel flow tube 130 shown in FIG. 2, the tube wall 134 and channel divisions 136 are an integral structure. For example, the tube wall 134 and channel divisions 136 are formed as a single piece or complete structural whole. Similarly, the channel tubes 436-536 and tube wall 434-534 may also be formed as an integral structure by, for example, adhering the channel tubes 436-536 and tube wall 434-534 to each other. The channel tubes 436-536 and tube wall 434-534 may be adhered to each other with brazing, adhesives, friction welding, etc.

By forming the two or more fluid channels 132, 332-532 as the integral structure, the vibratory meter 5 may be inexpensive to manufacture and be reliable. For example, stiffening members are not used between the two or more fluid channels 132, 332-532. By eliminating stiffening members, the associated manufacturing steps may also be eliminated. In addition, friction forces between each of the two or more fluid channels 132, 332-532 may not be present. For example, the channel tubes 436-536 shown in FIGS. 4 and 5 do not rub against each other or the tube wall 434, 534 as the flow tubes 430-530 are vibrated. This can prevent inter-tubal erosion, thereby extending the operating life of the flow tubes 430-530. Avoidance of friction forces in vibrating members may also be important to obtaining accurate mass flow and density measurements with a Coriolis flow meter.

As can be appreciated, an effective tube diameter of the multi-channel flow tubes 130, 330-530 is smaller than the diameter of the tube wall 134, 334-534. That is, the effective diameter of the multi-channel flow tubes 130, 330-530 may be about the diameter of the two or more fluid channels 132, 332-532. For example, the effective diameter of the multi-channel flow tube 530 shown in FIG. 5 may be about ⅓ of the diameter of the tube wall 134, 334-534. Accordingly, the multi-channel flow tubes 130, 330-530 may provide about or less than the capacity of a standard flow tube (i.e., flow tubes without the two or more fluid channels 132, 332-532) while realizing benefits associated with the smaller effective diameter.

Beneficial Effects

The multi-channel flow tube 130, 330-530 addresses the performance issues related to compressibility, decoupling, and flow profile effects. In addition, benefits related to pressure containment and erosion may also be realized. These benefits are explained in more detail in the following.

Compressibility

Vibratory meters require that the fluid flowing through the flow tubes move with the flow tubes during oscillation at the meter assembly's natural frequency. High frequency meters typically have not worked well for gas or entrained gas applications, due in part to the fact that the fluid moves too far on each oscillation. These compressibility, or velocity of sound, effects cause positive mass flow and density errors, which are predicted by the following closed-form equations (1) and (2), which are reproduced from Hemp J. and Kutin J., "Theory of Errors in Coriolis flowmeter readings due to compressibility of the fluid being metered", *Flow Measurement and Instrumentation*, 17: 359-369. In the following closed-form equations (1) and (2), ω is the angular oscillation frequency, d is the inner diameter of the flow tube, and c is the speed of sound of the process fluid. Note that errors increase with increasing tube diameter.

$$\rho_{VOS,err} = \frac{1}{4}\left(\frac{\omega d}{2c}\right)^2 \times 100 \qquad (1)$$

$$\dot{m}_{VOS,err} = \frac{1}{2}\left(\frac{\omega d}{2c}\right)^2 \times 100 \qquad (2)$$

While the forms of these equations appear simple, it may be difficult to use them to compensate for compressibility effects in practice. Even in single-phase gas or compressible liquid applications, it is necessary to know the speed of sound of the process fluid in order to compensate. In the case of multiphase applications, the mixture speed of sound, c, depends on a long list of difficult-to-measure parameters, including gas and liquid speeds of sound, gas and liquid densities, and gas void fraction.

However, the multi-channel flow tube 130, 330-530 can reduce or eliminate these problems because the effective tube diameter, d, can be considerably less than a standard flow tube. In the multi-channel flow tube 130, 330-530, the two or more fluid channels' 132, 332-532 diameter equal to ⅕$^{th}$ of the diameter of the tube wall 134, 334-534 may result in a 25 times reduction in errors due to velocity of sound effects. In other words, the multi-channel flow tube 130, 330-530 can eliminate velocity of sound effects. This would allow a designer of a vibratory meter to accept a higher vibration frequency (with associated benefit to meter compactness and cost) without sacrificing performance related to compressible liquids, gases, or multiphase mixtures.

Decoupling Effects

Vibratory meters typically require that the fluid flowing through them move directly with the flow tubes during vibration. When gas bubbles are introduced into a liquid stream, this assumption is no longer valid as there is relative motion, or "decoupling," between the two phases. A model can predict errors for specific fluid mixture properties. However, the model may require many unmeasured parameters as inputs, including bubble size and liquid viscosity, making direct compensation of errors difficult. The model and experimental results show that vibratory meters with relatively small diameter flow tubes typically perform better and have less measurement error.

This is explained by the fact that one of the assumptions made in the decoupling model is that the fluid inside the tube represents a uniform distribution of bubbles in an infinite liquid medium. It does not account for a reduction in decoupling due to the presence of nearby tube walls. A numerical study of wall effects in oscillatory flow by Fischer P F, Leaf G K, and Restrepo J M, "Influence of wall proximity on the lift and drag of a particle in an oscillatory flow", *Journal of Fluids Engineering*. 127:583-595 (2005) shows that wall effects are negligible unless the particle is less than two radii from the wall. Stated another way, wall effects become important only when the ratio of particle diameter to tube diameter approaches unity. An experimental study by Coimbra et al., "An experimental study on stationary history effects in high-frequency Stokes flows", *J. Fluid Mech.* 504:353-363, confirms these results. The experiment involves oscillation of a tethered particle in a fluid column at frequencies up to 80 Hz. For many vibratory meters, bubbles are small compared to the tube diameter, and wall effects are negligible, resulting in unrestricted decoupling and large errors.

Figure 6:
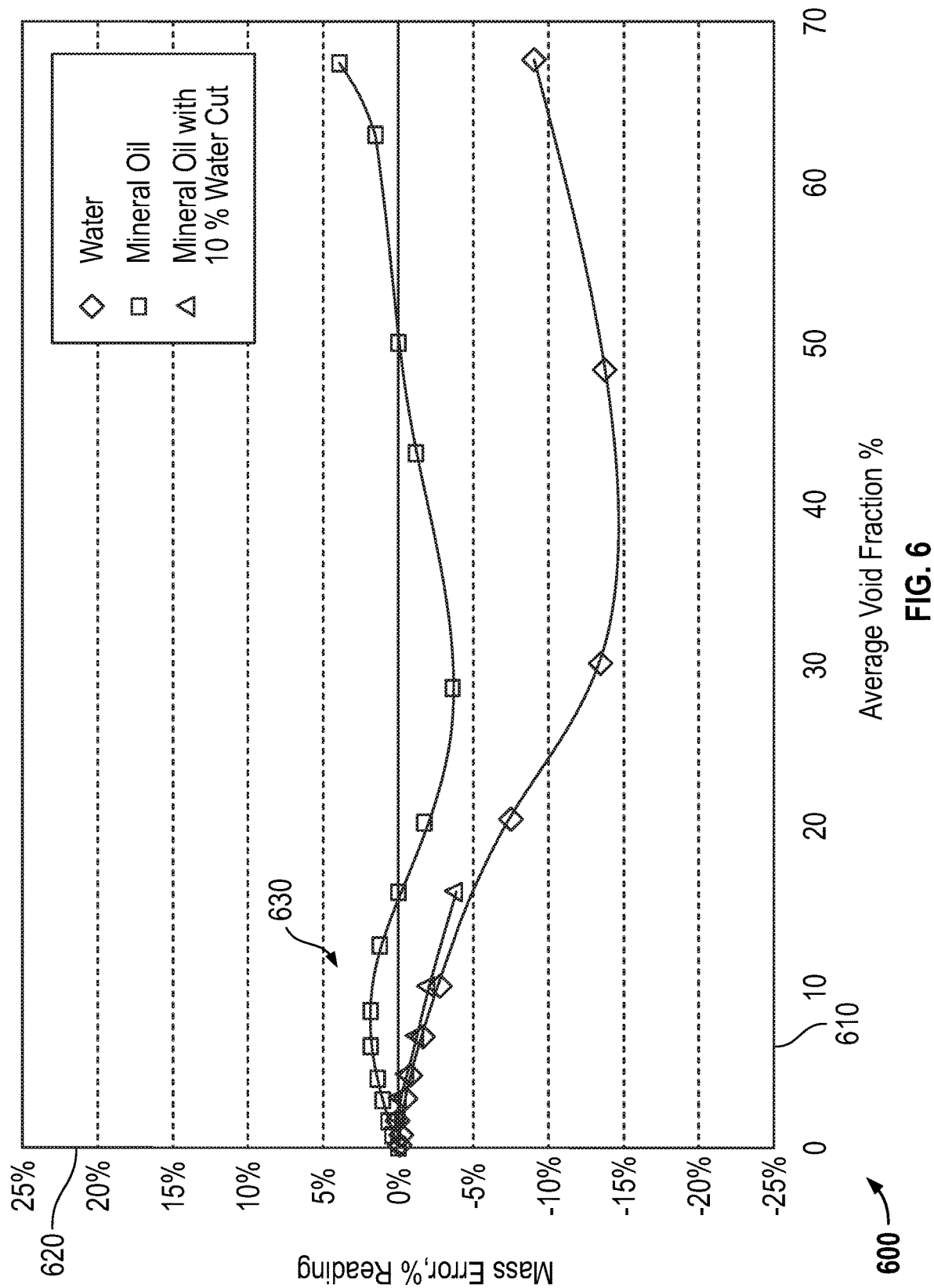
FIG. 6 shows a graph 600 of a mass error percent reading of a standard flow tube having a relatively small diameter of ¼".

FIG. 6 shows a graph 600 of a mass error percent reading of a standard flow tube having a relatively small diameter of ¼". The graph 600 includes an average void fraction percentage axis 610 and a mass error percent reading axis 620. The graph 600 includes mass error reading plots 630 that illustrate variation in the mass error reading relative to the average void fraction percentage. The mass error reading plots 630 include mass error readings for water, mineral oil, and mineral oil with 10% water cut. The mass error readings for the various fluids range from less than 5% to −15% and drops to less than −10% at greater than 60% void fraction. The mass error reading plots 630 show that, in smaller diameter standard flow tubes, such as ¼" diameter flow tubes, the bubbles are constrained from decoupling by the presence of the tube walls, leading to less error, over a wide range of void fractions.

Accordingly, the multi-channel flow tubes 130, 330-530, which include the two or more fluid channels 132, 332-532 that have a diameter less than the diameter of the tube wall 134, 334-534 (e.g., a ⅕$^{th}$ inch fluid channel in a 1-inch tube wall), can result in usable measurements from fluids with greater than 50% gas void fraction. The measurement accuracy of total mass flow rate may be comparable to that of dedicated multiphase meters that can cost many hundreds of thousands of dollars and employ nuclear technology, which may be undesirable. The same performance can be achieved in the vibratory meter 5 with the multi-channel flow tubes 130, 330-530, which can prevent decoupling from occurring, without the expense and hazards that may be associated with more complex technologies. For example, the multi-channel flow tubes 130, 330-530 with an effective tube diameter equal to 1/10th of the diameter of the tube wall 134, 334-534 would allow performance similar to that found in smaller diameter standard tubes and without costing hundreds of thousands of dollars and without employing nuclear technology.

Decoupling also causes asymmetric damping because of the secondary motion of bubbles moving through the base liquid in the direction of tube oscillation. Asymmetric damping from the inlet to outlet of a vibratory flow meter with a standard flow tube can cause large false mass flow readings. One cause of asymmetric bubble distribution is buoyancy, which can cause bubbles to be trapped in one part of the standard flow tube and not the other parts. If the bubble distribution is asymmetric along the length of the tube, then asymmetric damping occurs. High flow rate minimizes this phenomenon, keeping the mixture homogeneous, but high flow rate also results in increased pressure drop and can cause flashing due to decreased static pressure. In addition, even with high flow rate, asymmetric damping may always be present to some degree. In the multi-channel flow tubes 130, 130', this damping may be reduced because the entire cross-section of the multi-channel flow tubes 130, 130' may be either liquid or gas, but may not be a mixture of both. Additionally, if the bubble takes up the entire cross section, then the bubble is forced to move at the same flow rate as the liquid. As a result, there can no longer be gas hold up on one side of the vibratory meter 5, and the gas may be more evenly distributed down the length of the multi-channel flow tubes 130, 130'.

Flow Profile Effects

The magnitude of error due to a velocity profile effect may also depend on Reynolds Number, Stokes Number, and tube geometry. Some of the variables that define these non-dimensional parameters are dependent on fluid properties. However, the magnitude of flow profile effect is strongly dependent on the ratio of the length (L) of the flow tube to its diameter (D). Larger vibratory meters have a relatively low L/D ratio. Typically, vibratory meters with L/D ratios above 25 have no measurable flow profile effect. The multi-channel flow tubes 130, 330-530, because they have a lower effective diameter, could be employed to increase the L/D ratios of higher flow rate vibratory meters to eliminate flow profile effect in larger vibratory meters. In fact, a multi-channel flow tube 130 with individual tube diameters even one half as large as the tube wall 134 would result in L/D ratios above 25 for vibratory meters of many different sizes.

Pressure Containment Benefits

Another benefit of the multi-channel flow tube 130 is a higher pressure rating. In the standard flow tube without the two or more fluid channels, as tube diameter decreases, pressure rating increases (Hoop Stress=Pressure*Radius/Thickness). The standard tubes with large diameters typically have thicker walls, reducing flow sensitivity and performance. However, the multi-channel flow tube 130 resolves this problem by employing two or more fluid channels 132, each with a pressure rating that may be higher than a single tube of equivalent flow area. Additionally, pressure effect on flow and density would be substantially reduced. However, the multi-channel flow tubes 330-530 shown in FIGS. 3-5 may have improved pressure containment over the single axis division multi-channel flow tube 130 shown in FIG. 2.

Erosion

Erosion may also be reduced in the tube bundle meter. Erosion is typically highly dependent on Reynolds number, which increases with increasing tube diameter. At lower Reynolds numbers (smaller effective diameter), erosion is reduced. Also, because the multi-channel flow tubes 130, 330-530 can reduce or eliminate asymmetric damping problems, fluid velocities need not be kept as high to obtain good performance in gas entrainment applications. This results in a lower Reynolds number, and thus less erosion.

Due to these and other benefits, the measurements obtained from vibratory meters employing a multi-channel flow tube, such as the vibratory meter 5 described in the foregoing, may be more accurate than standard flow tubes without the two or more fluid channels. Exemplary measurements are described in the following with reference to FIGS. 7-12.

Percent Error Data

Figure 7:
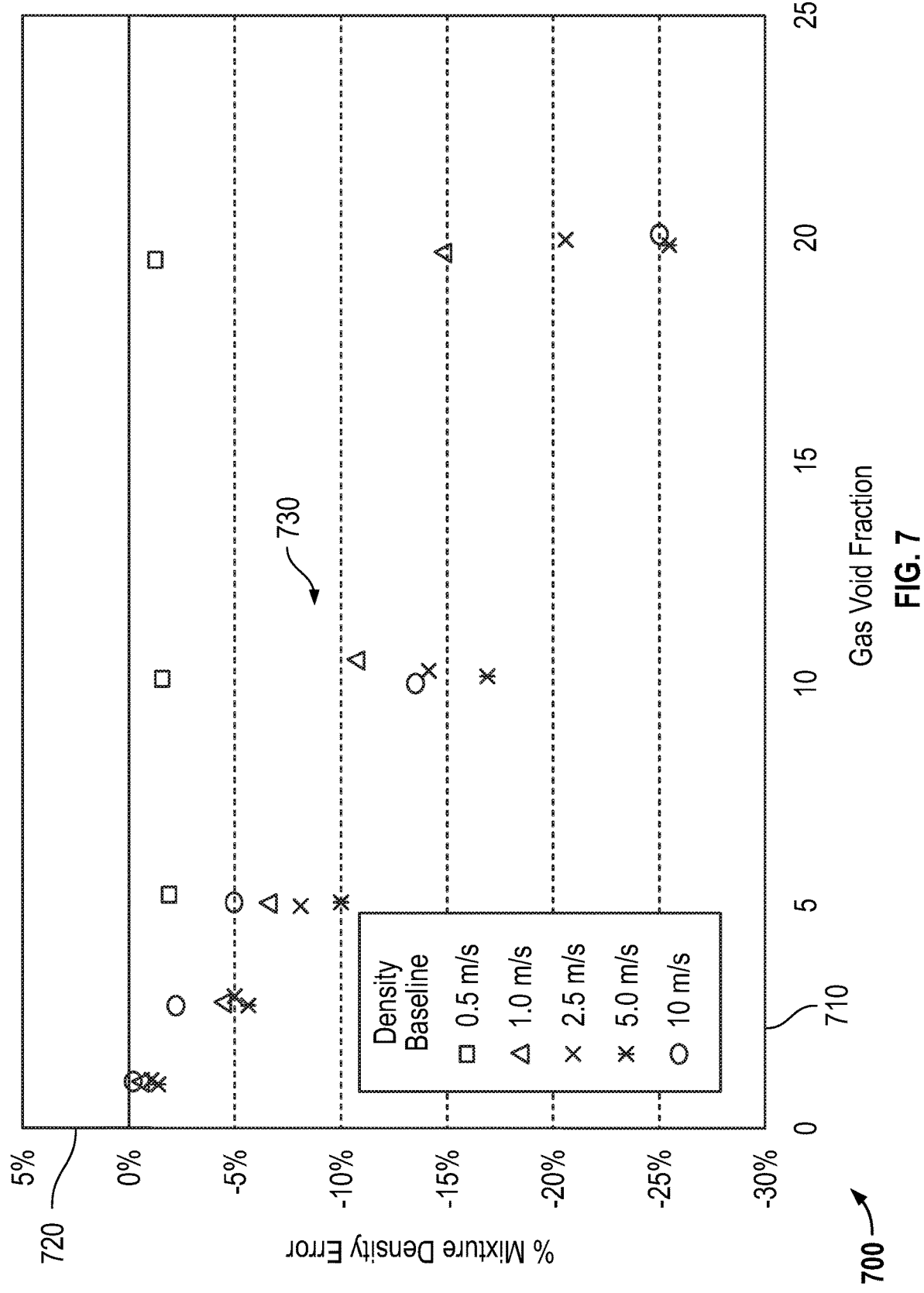
FIG. 7 shows a graph 700 illustrating a relationship between density errors and gas void fraction for a standard flow tube without the two or more fluid channels ("density baseline").
Figure 8:
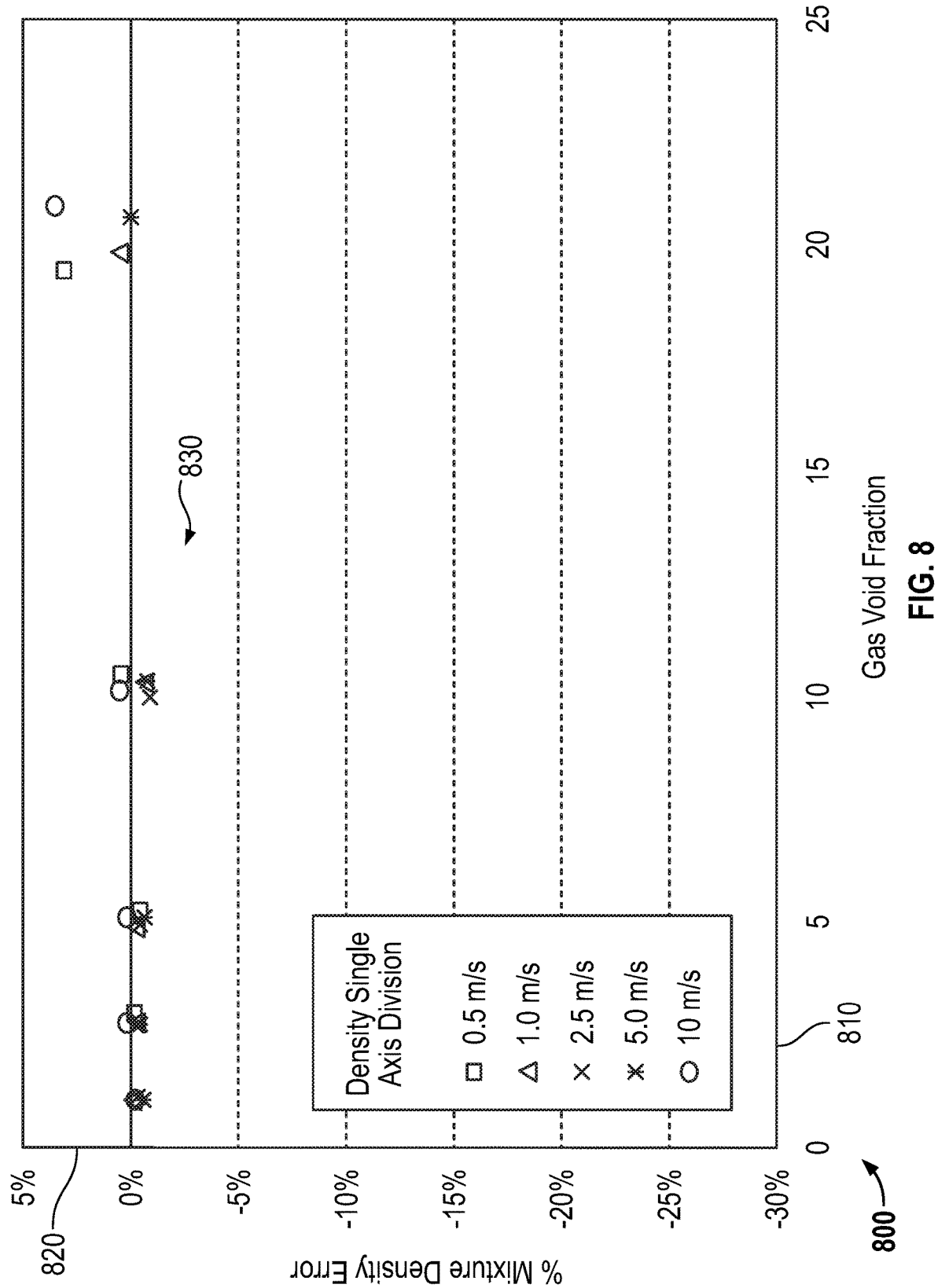
FIG. 8 shows a graph 800 illustrating a relationship between density errors and gas void fraction for a multi-channel flow tube with the single axis division shown in FIG. 3 according to an embodiment ("density single axis division").
Figure 9:
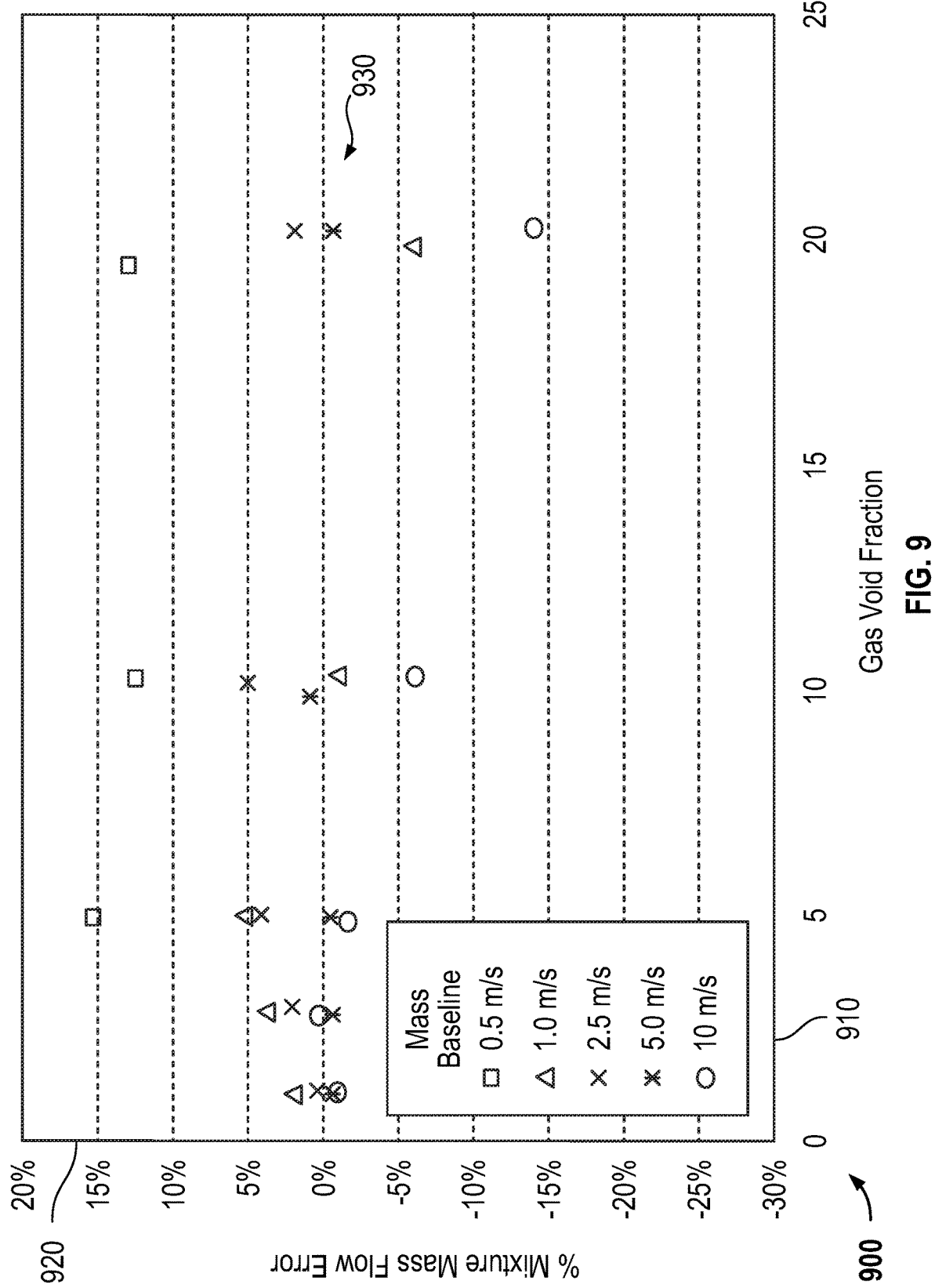
FIG. 9 shows the graph 900 illustrating a relationship between mass flow rate errors and gas void fraction for a standard flow tube without the two or more fluid channels ("mass baseline").
Figure 10:
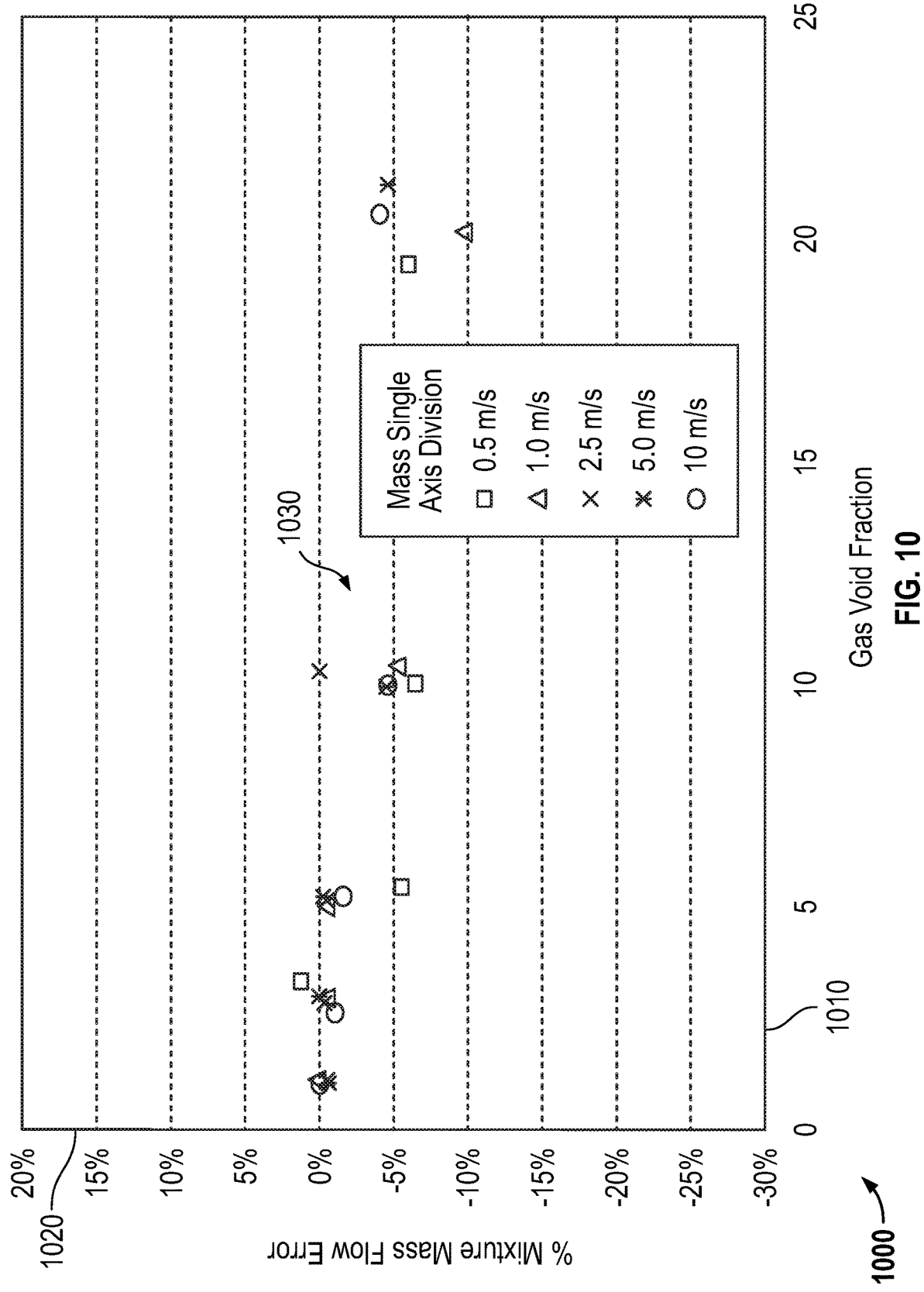
FIG. 10 shows the graph 1000 illustrating a relationship between mass flow rate errors and gas void fraction for a multi-channel flow tube with the single axis division shown in FIG. 2 according to an embodiment ("mass single axis division").
Figure 11:
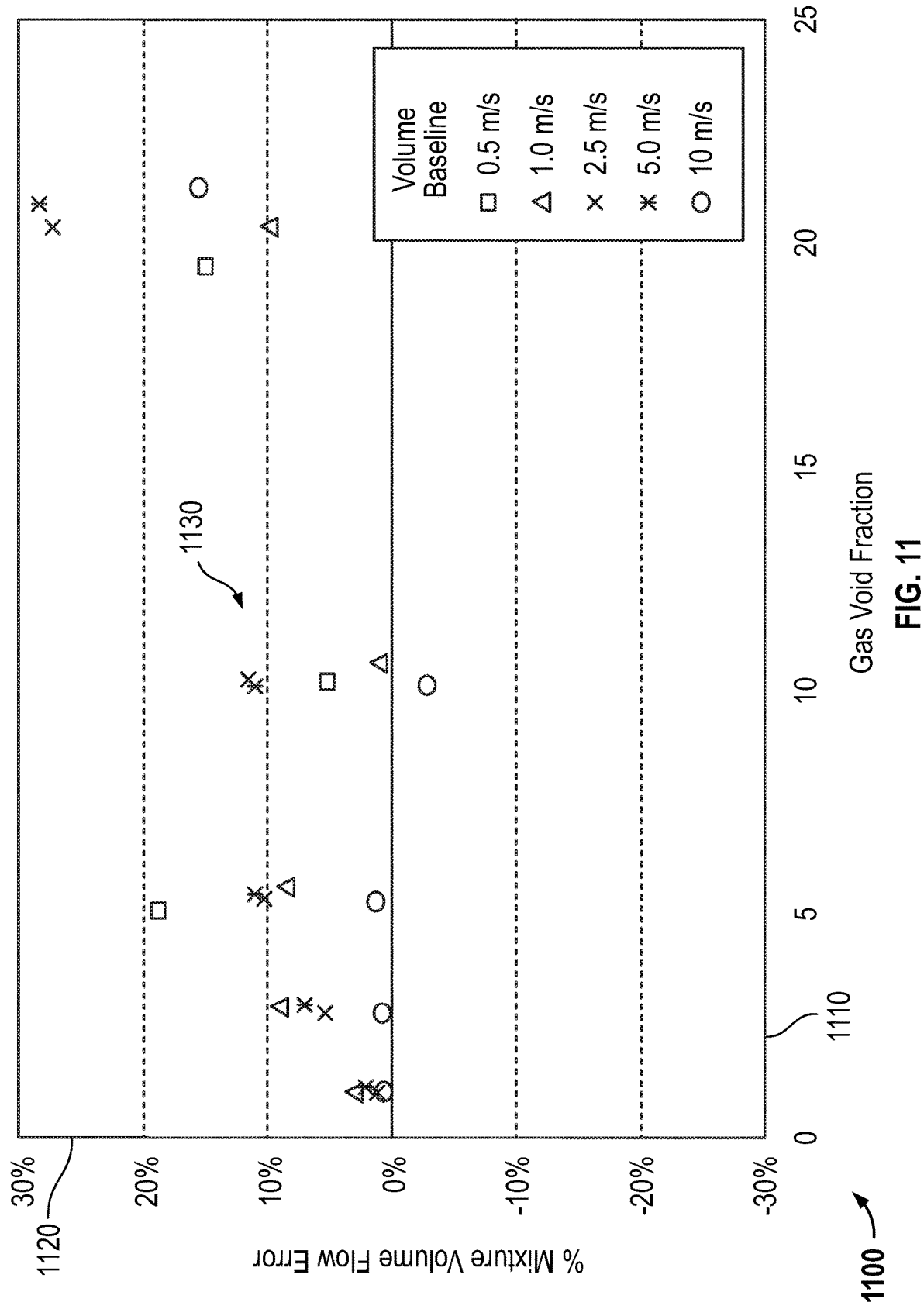
FIG. 11 shows the graph 1100 illustrating a relationship between volume flow rate errors and gas void fraction for a standard flow tube ("volume baseline").
Figure 12:
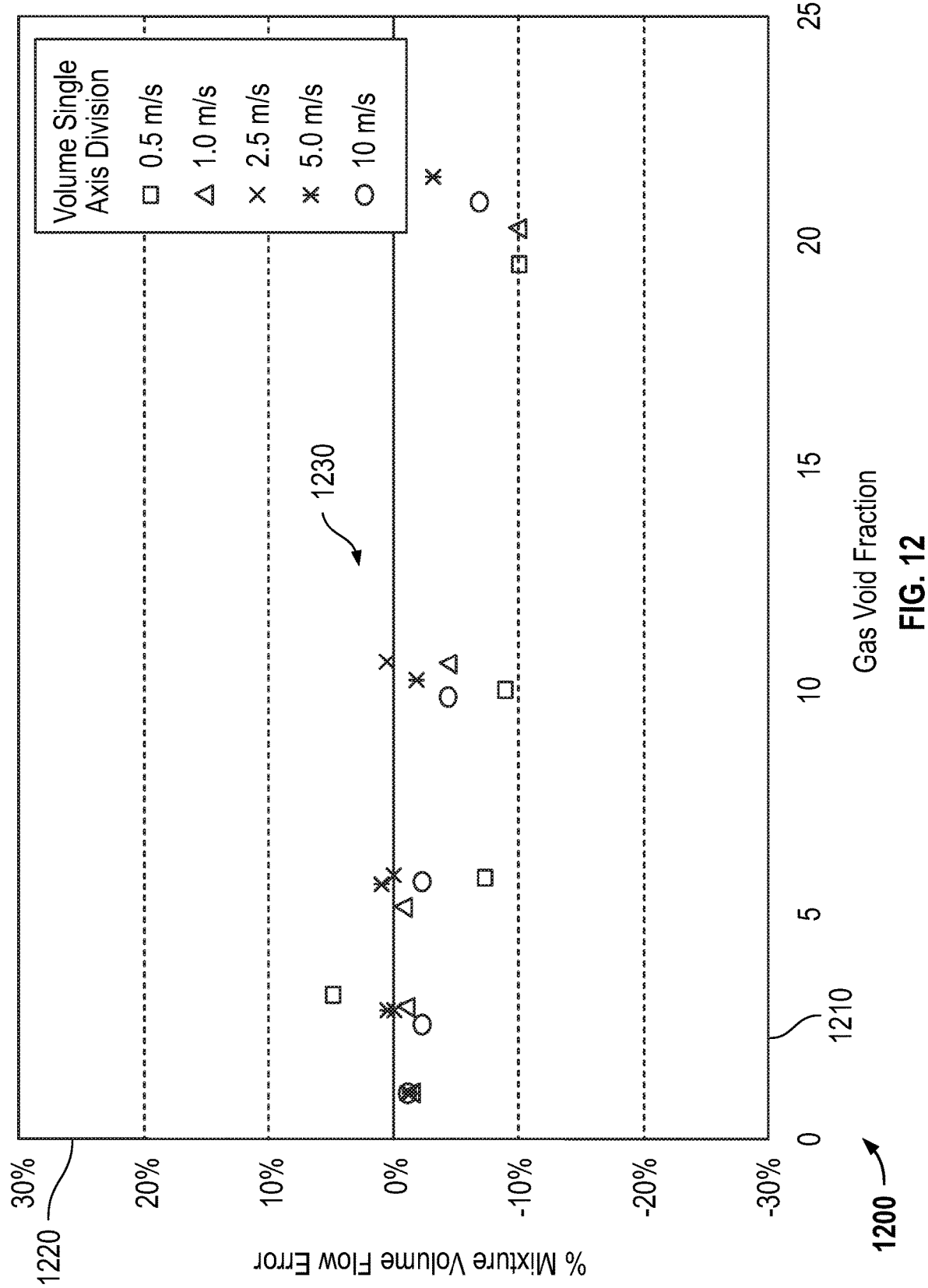
FIG. 12 shows the graph 1200 illustrating a relationship between volume flow rate errors and gas void fraction for a multi-channel flow tube with the single axis division shown in FIG. 2 according to an embodiment ("volume single axis division").

FIGS. 7 through 12 described in the following show density, mass, and volume flow rate errors associated with a standard flow tube without two or more fluid channels (FIGS. 7, 9, and 11 labeled with "baseline") and single axis division multi-channel flow tube shown in the FIG. 2 (FIGS. 8, 10, and 12 labeled with "single axis division"). The data shown in the FIGS. 7 through 12 was obtained from water flowing through a 1-inch flow meter with a circular cross section.

Density Errors

FIGS. 7 and 8 are graphs 700, 800 directed to density errors. The graphs 700, 800 include gas void fraction axes 710, 810, which is the abscissa, and a percent mixture density error axes 720, 820, which is the ordinate. The gas void fraction axes 710, 810 range from 0 to 25%. The percent mixture density error axes 720, 820 range from −30% to 5%.

FIG. 7 shows the graph 700 illustrating a relationship between density errors and gas void fraction for a standard flow tube without the two or more fluid channels ("density baseline"). The graph 700 has data plots 730 of data for different flow rates, ranging from 0.5 m/s to 10 m/s. The data plots 730 indicate that the percent mixture density error is relatively low at low gas void fractions. However, the percent mixture density error increases at higher gas void fraction percentages. For example, at a flow rate of 10 m/s, the percent mixture density error increases from less than 1% to about 25%. The percent mixture density error is also highly dependent on fluid velocity because of changing bubble size and the presence of asymmetric damping. Here, the error increases with increased flow rate, while in other situations, the opposite trend is observed.

FIG. 8 shows the graph 800 illustrating a relationship between density errors and gas void fraction for a multi-channel flow tube with the single axis division shown in FIG. 3 according to an embodiment ("density single axis division"). The graph 800 has data plots 830 of data for different flow rates, ranging from 0.5 m/s to 10 m/s. The data plots 830 indicate that the percent mixture density error is relatively low at low gas void fractions. The percent mixture density error increases at higher gas void fraction percentages. However, the percent mixture density error does not increase as much as shown in FIG. 7. For example, at a flow rate of 10 m/s, the percent mixture density error increases from less than 1% to less than 5%, in contrast to the increase from less than 1% to about 25% shown in FIG. 7.

Mass Flow Errors

FIGS. 9 and 10 are graphs 900, 1000 directed to mass flow errors. The graphs 900, 1000 include gas void fraction axes 910, 1010, which is the abscissa, and a percent mixture mass flow error axes 920, 1020, which is the ordinate. The gas void fraction axes 910, 1010 range from 0 to 25%. The percent mixture mass flow error axes 920, 1020 range from −30% to 20%.

FIG. 9 shows a graph 900 illustrating a relationship between mass flow rate errors and gas void fraction for a standard flow tube without the two or more fluid channels ("mass baseline"). The graph 900 has data plots 930 of data for different flow rates, ranging from 0.5 m/s to 10 m/s. The data plots 930 indicate that the percent mixture mass flow error is relatively low at low gas void fractions. However, the percent mixture mass flow error increases at higher gas void fraction percentages. The percent mixture mass flow error is highly erratic and variable with flow rate. For example, at a flow rate of 10 m/s, the percent mixture mass flow error increases from less than 1% to about 15%, with a maximum to minimum span of about 30%.

FIG. 10 shows a graph 1000 illustrating a relationship between mass flow rate errors and gas void fraction for a multi-channel flow tube with the single axis division shown in FIG. 2 according to an embodiment ("mass single axis division"). The graph 1000 has data plots 1030 of data for different flow rates, ranging from 0.5 m/s to 10 m/s. The data plots 1030 indicate that the percent mixture mass flow error is relatively low at low gas void fractions. The percent mixture mass flow error increases at higher gas void fraction percentages. However, the percent mixture mass flow error does not increase as much as shown in FIG. 9. For example, at a flow rate of 10 m/s, the percent mixture mass flow error increases from less than 1% to less than 5%, with a maximum to minimum span of about 30%. Furthermore, the span of 30% between maximum and minimum errors at high void fraction observed in FIG. 10 is far greater than the span of about 5% shown in FIG. 11. In other words, the errors are not only smaller, but less erratic and less variable with changing flow rate.

Volume Flow Errors

FIGS. 11 and 12 are graphs 1100, 1200 directed to volume flow errors. The graphs 1100, 1200 include gas void fraction axes 1110, 1210, which is the abscissa, and a percent mixture volume flow error axes 1120, 1220, which is the ordinate. The gas void fraction axes 1110, 1210 range from 0 to 25%. The percent mixture volume flow error axes 1120, 1220 ranges from −30% to 30%.

FIG. 11 shows a graph 1100 illustrating a relationship between volume flow rate errors and gas void fraction for a standard flow tube ("volume baseline"). The graph 1100 has data plots 1130 of data for different flow rates, ranging from 0.5 m/s to 10 m/s. The data plots 1130 indicate that the percent mixture volume flow error is relatively low at low gas void fractions. However, the percent mixture volume flow error increases at higher gas void fraction percentages. The percent mixture volume flow error is highly erratic and variable with flow rate. For example, at a flow rate of 10 m/s, the percent mixture volume flow error increases from less than 1% to about 15%, with a maximum to minimum span of about 30%.

FIG. 12 shows a graph 1200 illustrating a relationship between volume flow rate errors and gas void fraction for a multi-channel flow tube with the single axis division shown in FIG. 2 according to an embodiment ("volume single axis division"). The graph 1200 has data plots 1230 of data for different flow rates, ranging from 0.5 m/s to 10 m/s. The data plots 1230 indicate that the percent mixture volume flow error is relatively low at low gas void fractions. The percent mixture volume flow error increases at higher gas void fraction percentages. The percent mixture volume flow error also increases as the flow rate increases. However, the percent mixture volume flow error does not increase as much as shown in FIG. 11. For example, at a flow rate of 10 m/s, the percent mixture volume flow error increases from less than 1% to less than 10%, in contrast to the increase from less than 1% to about 15% shown in FIG. 11. As can be appreciated when comparing FIGS. 11 and 12, the multi-channel flow tube 130 with the single axis division shown in FIG. 2 has at least a 3 times improvement over a standard flow tube.

In addition, data from FIG. 8 can be used to compensate for the flow rate error in the mass and volume flow rate measurements shown in FIGS. 10 and 12. The mixture density error illustrated by the data plots 830 is consistently less than 5% over a range of gas void fractions and flow rates. Accordingly, the gas void fraction of a liquid-gas mixture can be accurately correlated with a density measurement. In addition, the mass and volume flow rates shown in FIGS. 10 and 12 are precise within about 10% at each flow rate. Since the gas void fraction can be accurately correlated with the density reading and the mass and volume flow rates are precise, then the mass and/or volume flow rates can be measured and compensated by using the gas void fraction correlated with the density reading, which is described in more detail in the following with reference to the methods shown in FIGS. 13 and 14.

Methods

Figure 13:
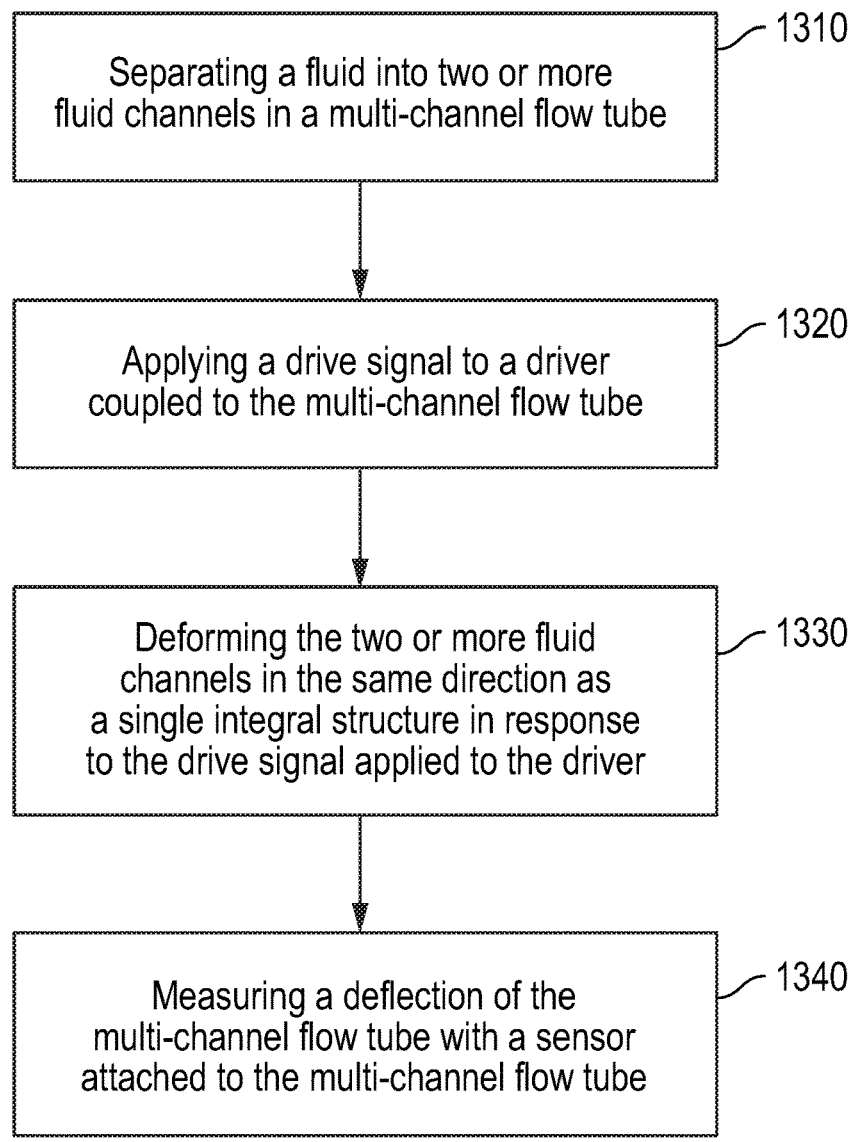
FIG. 13 shows a method 1300 of measuring a fluid with a multi-channel flow tube.

FIG. 13 shows a method 1300 of measuring a fluid with a multi-channel flow tube. As shown in FIG. 13, the method 1300 begins by separating the fluid into two or more fluid channels in a multi-channel flow tube in step 1310. The two or more fluid channels are surrounded by a tube wall. The tube wall and two or more fluid channels are formed as a single integral structure. For example, the multi-channel flow tube may be one of the multi-channel flow tubes 130, 330-530 described with reference to FIGS. 1-5. In step 1320, the method 1300 applies a drive signal to a driver coupled to the multi-channel flow tube. The driver is configured to vibrate the multi-channel flow tube. The method 1300, in step 1330, bends the two or more fluid channels and the tube wall in the same direction as the single integral structure in response to the drive signal applied to the driver. In step 1340, the method 1300 measures a deflection of the multi-channel flow tube with a sensor attached to the multi-channel flow tube.

The step 1310 of separating the fluid into the two or more fluid channels may include separating a gas component of the fluid into one of the two or more fluid channels. For example, the fluid may be a multi-component fluid with, for example, slug flow. A slug in the slug flow may be separated from the multi-component fluid into the one of the two or more fluid channels. The gas component can also fill the one of the two or more fluid channels. Separating the gas component can ensure that the separated gas component vibrates or deflects the same as the liquid portion of the liquid portion of the multi-component fluid flow.

Applying the drive signal, in step 1320, to the multi-channel flow tube can include applying a drive signal to a tube wall with channel divisions within the tube wall, channel tubes that are affixed to each other, a tube wall that surrounds channel tubes, etc. For example, with reference to the multi-channel flow tubes 130, 130' shown in FIGS. 1 and 2, the drive signal is applied to the driver 180, which is coupled to the tube wall 134. Similarly, the driver 180 may be coupled to the tube walls 434, 534 shown in FIGS. 4 and 5. However, the drive signal may also be applied to the channel tubes 436, 536 also shown in FIGS. 4 and 5, where, for example, the tube walls 434, 534 leave a portion of the channel tubes 436, 536 exposed.

As a result of the drive signal, the multi-channel flow tube can bend as the single integral structure in the same direction. For example, the multi-channel flow tubes 130, 130', 330 described with reference to FIGS. 1-3 bend as a single integral structure in the direction of the force applied by the driver 180 because the tube wall 134, 334 and channel divisions 136, 336 are formed as the single integral structure by, for example, extruding or 3-D printing the tube wall 134, 334 and the channel divisions 136, 336. Accordingly, the force applied by the driver 180 to the multi-channel flow tube 130, 330 causes the tube walls 134, 334 and the two or more fluid channels 132, 332 to deflect by substantially the same amount. Similarly, the two or more fluid channels 432, 532 shown in FIGS. 4 and 5 also bend in the same direction due to the force applied by the driver 180 to the tube walls 434, 534 or the channel tubes 436, 536. The channel tubes 436, 536 and the tube wall 434, 534 can bend as the single integral structure due to, for example, brazing between the channel tubes 436, 536 and between the tube wall 434, 534 and the channel tubes 436, 536.

The deflection of the multi-channel flow tube may be measured by pick-off sensors that are coupled to the multi-channel flow tube. For example, with reference to the multi-channel flow tubes 130, 130' shown in FIGS. 1 and 2, the pick-off sensors 170$l$ and 170$r$ can measure a deflection of the multi-channel flow tubes 130, 130' where the pick-off sensors 170$l$ and 170$r$ are located. The deflection where the pick-off sensors 170$l$ and 170$r$ are located is due to the deforming of the multi-channel flow tube 130, 130' caused by the drive signal applied to the driver 180. Similar to the driver 180, the pick-off sensors 170$l$ and 170$r$ can be coupled to the tube walls 134, 334 or the channel tubes 436, 536.

Figure 14:
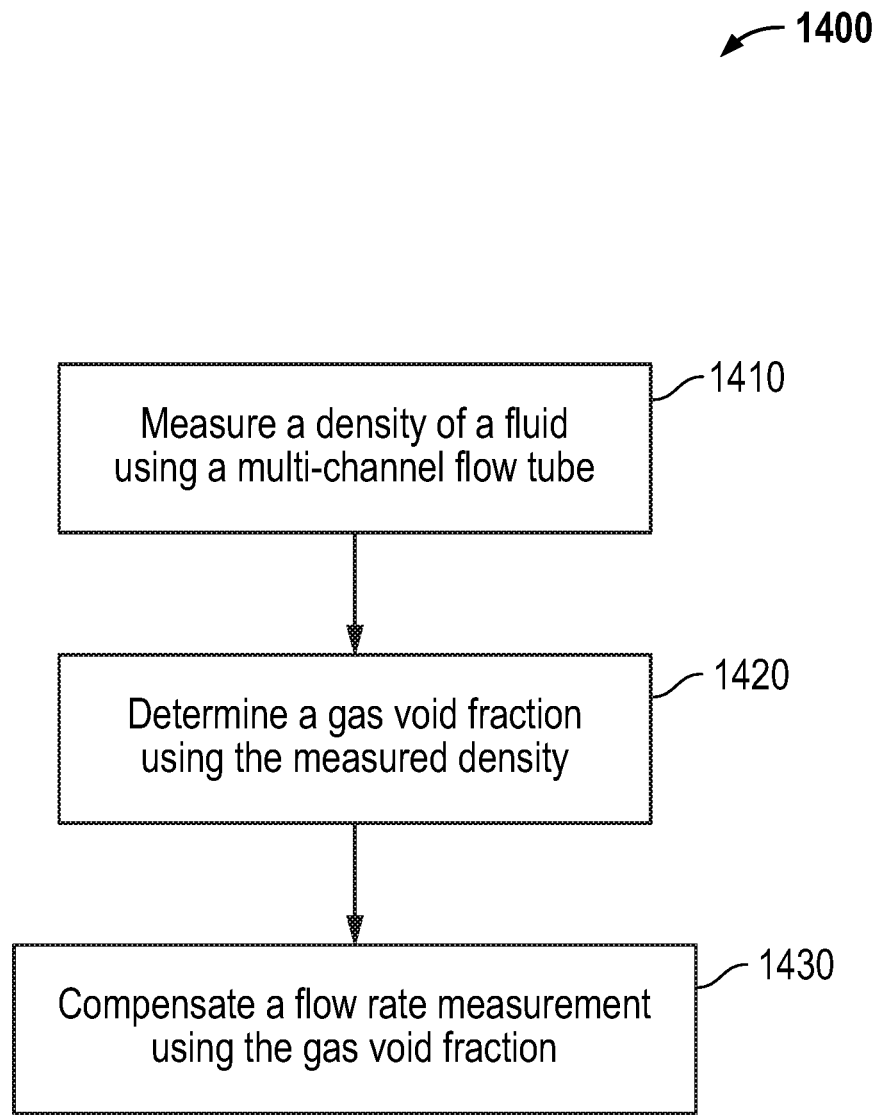
FIG. 14 shows another method 1400 of measuring a fluid with a multi-channel flow tube.

FIG. 14 shows another method 1400 of measuring a fluid with a multi-channel flow tube. As shown in FIG. 14, the method 1400 measures a density of a fluid using a multi-channel flow tube in step 1410. The multi-channel flow tube used in step 1410 may be the multi-channel flow tube 130 shown in FIG. 2, which is a single axis division multi-channel flow tube, although any suitable multi-channel flow tube may be employed. In step 1420, a gas void fraction is determined using the measured density. In step 1430, the method 1400 compensates a flow rate measurement, such as a mass or volume flow rate measurement, using the gas void fraction.

In step 1410, the density measurement may be performed as described with reference to FIG. 13. Due to using the multi-channel flow tube, the density measurements can have an error rate that is less than 5% and is consistent over a range of flow rates and gas void fractions. Accordingly, the gas void fraction of a mixed phase fluid, such as water and air, can be determined from the density measurement combined with, for example, knowledge of the liquid density. The liquid density can be found during periods of no gas, known from the data stored in the meter electronics 20, entered by the customer, etc.

In step 1420, the gas void fraction can be determined using the measured density by using, for example, the data plots 830 and/or the interpolation of the data plots 830, although any suitable correlation between the measured density and the gas void fraction may be employed. For example, the processor in the meter electronics 20 can use the measured density to look up the correlated gas void fraction in a look up table. A processor in the meter electronics 20 can interpolate (e.g., linear, polynomial, etc.) between each data point in the data plots 830 to provide the correlation between the density measurement and the gas void fraction. The interpolation can also be stored in the memory as a formula, look up table, etc.

In step 1430, the measured flow rate may be compensated with the gas void fraction by using, for example, an additional look up table, formula or the like. The look up table, formula, or the like, may correlate a flow rate error, such as a mass or volume flow rate error, with a gas void fraction. For example, with reference to FIG. 10, the gas void fraction of 20% may have a correlated mass flow rate error of about −6%. The measured mass flow rate can be compensated by multiplying the measured mass flow rate by the correlated mass flow rate error and adding the result to the measured mass flow rate. This may be referred to as the compensated measured mass flow rate. A compensated measured volume flow rate may be determined in a similar manner.

The measured mass flow rate may be continuously compensated during operation using predetermined correlations between the measured density and the gas void fractions and between the flow rate error and gas void fraction. For example, during manufacturing or calibration, the vibratory meter 5 can measure density and flow rates of the fluid over a range of gas void fractions and flow rates. The measured density and flow rates can be stored in the meter electronics 20 as look up tables, formulas, or the like. The flow rate errors can also be determined by using, for example, another reference flow meter during manufacturing or calibration. The measurements from the reference flow meter may be compared to the flow rates measured by the vibratory meter 5 to determine the flow rate error. During operation, the meter electronics 20 may continuously correlate the measured density with the gas void fraction and compensate the measured flow rate as described in the foregoing with reference to FIG. 14.

The embodiments described above provide the vibratory meter 5 with the multi-channel flow tubes 130, 330-530. The multi-channel flow tubes 130, 330-530 include two or more fluid channels 132, 332-532. The two or more fluid channels provide the effective diameter of the multi-channel flow tubes 130, 330-530 that is less than the diameter of the tube wall 134, 334-534. Due to the effective diameter of the multi-channel flow tube 130, 330-530 being smaller than the diameter of the tube wall 134, 334-534, the performance issues related to compressibility, decoupling, and flow profile effects may be improved. In addition, the pressure containment may be improved. As a result, the vibratory meter 5 may be less expensive and use simpler manufacturing steps than many multiphase metering technologies, while also providing more accurate multiphase flow rate measurements.

For example, the multi-channel flow tubes 130, 330-530 may provide accurate density measurements over a range of gas void fractions and flow rates. The density measurements can therefore be used to accurately determine the gas void fraction of the multiphase fluid. In addition, the multi-channel flow tubes 130, 330-530 can also provide precise mass or volume flow rate measurements. Accordingly, the mass or volume flow rates can be compensated using the gas void fractions determined by the meter electronics 20. As a result, the mass or volume flow rate measurements of multiphase fluids can be accurate without the expense associated with other multiphase technologies.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to multi-channel flow tubes and not just to the embodiments described above and shown in the accompanying figures. Accordingly, the scope of the embodiments described above should be determined from the following claims.

We claim:
1. A vibratory meter (5) including a multi-channel flow tube (130), the vibratory meter (5) comprising:
  a meter electronics (20); and
  a meter assembly (10) communicatively coupled to the meter electronics (20), the meter assembly (10) comprising:
  the multi-channel flow tube (130, 330, 430, 530) comprising two or more fluid channels (132, 332, 432, 532) surrounded by a tube wall (134, 334, 434, 534), wherein the two or more fluid channels (132, 332, 432, 532) and tube wall (134, 334, 434, 534) comprise a single integral structure; and
  a driver (180) coupled to the tube wall (134, 334, 434, 534), the driver (180) being configured to vibrate the multi-channel flow tube (130, 330, 430, 530);
  wherein the two or more fluid channels (132, 332, 432, 532) and tube wall (134, 334, 434, 534) are configured to deform in a same direction as the single integral structure in response to a drive signal applied to the driver (180).

2. The vibratory meter (5) of claim 1, wherein the two or more fluid channels (132) are defined by one or more channel divisions (136) having a planar shape extending along a longitudinal length of the multi-channel flow tube (130).

3. The vibratory meter (5) of claim 1, wherein the two or more fluid channels (432, 532) are defined by channel tubes (436, 536) affixed to each other and extending along a longitudinal length of the multi-channel flow tube (430, 530).

4. The vibratory meter (5) of claim 1, wherein the two or more fluid channels (132, 332, 432, 532) are substantially parallel with each other.

5. The vibratory meter (5) of claim 1, wherein each of the two or more fluid channels (132, 332, 432, 532) have at least one of a rectangular cross section and a circular cross section.

6. The vibratory meter (5) of one claim 1, wherein a longitudinal length of the two or more fluid channels (132, 332, 432, 532) is substantially equal to a longitudinal length of a vibratory portion of the multi-channel flow tube (130, 330, 430, 530).

7. The vibratory meter (5) of claim 1, wherein a longitudinal length of the tube wall (134, 334, 434, 534) is substantially equal to a longitudinal length of the two or more fluid channels (132, 332, 432, 532).

8. A method of measuring a fluid with a multi-channel flow tube, the method comprising:
  separating the fluid into two or more fluid channels in a multi-channel flow tube surrounded by a tube wall, wherein the two or more fluid channels and tube wall comprise a single integral structure;
  applying a drive signal to a driver coupled to the tube wall, the driver being configured to vibrate the multi-channel flow tube;
  deforming the two or more fluid channels and the tube wall in a same direction as the single integral structure in response to the drive signal applied to the driver; and
  measuring a deflection of the multi-channel flow tube with a sensor attached to the multi-channel flow tube.

9. The method of claim 8, wherein separating the fluid into two or more fluid channels comprises separating a gas component of the fluid into one of the two or more fluid channels.

10. The method of claim 8, wherein separating the fluid into two or more fluid channels comprises filling a cross section of one of the two or more fluid channels with a gas component of the fluid.

11. The method of claim 8, wherein applying the drive signal to the driver coupled to the multi-channel flow tube comprises applying the drive signal to the driver coupled to the tube wall, wherein the two or more fluid channels are defined by one or more channel divisions having a planar shape extending along a longitudinal length of the multi-channel flow tube.

12. The method of claim 8, wherein applying the drive signal to the driver coupled to the multi-channel flow tube comprises applying the drive signal to the driver coupled to the tube wall, wherein the two or more fluid channels are defined by channel tubes affixed to each other and extending along a longitudinal length of the multi-channel flow tube.

13. The method of claim 8, wherein deforming the two or more fluid channels and the tube wall in the same direction comprises deforming a longitudinal length of the two or more fluid channels that is substantially equal to a longitudinal length of a vibratory portion of the multi-channel flow tube.

14. The method of claim 8, wherein deforming the two or more fluid channels and the tube wall in the same direction comprises deforming a longitudinal length of the tube wall that is substantially equal to a longitudinal length of the two or more fluid channels.

15. A method of measuring a fluid with a multi-channel flow tube, the method comprising:
    measuring a density of the fluid with the multi-channel flow tube;
    determining a gas void fraction using the measured density; and
    compensating a flow rate measurement using the gas void fraction.

16. The method of claim 15, wherein determining the gas void fraction using the measured density comprises determining the gas void fraction from a predetermined correlation between the density measurement and the gas void fraction.

17. The method of claim 15, wherein compensating the flow rate measurement comprises:
    determining a flow rate error from a predetermined correlation between the flow rate error and the gas void fraction; and
    compensating the flow rate measurement using the flow rate error.

* * * * *